(12) United States Patent
Kim et al.

(10) Patent No.: US 9,824,266 B2
(45) Date of Patent: Nov. 21, 2017

(54) HANDWRITING INPUT APPARATUS AND CONTROL METHOD THEREOF

(71) Applicant: SAMSUNG ELECTRONICS CO., LTD., Suwon-si (KR)

(72) Inventors: Sang-Ho Kim, Hwaseong-si (KR); Do-Hyeon Kim, Suwon-si (KR); Dong-Hyuk Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/811,912

(22) Filed: Jul. 29, 2015

(65) Prior Publication Data

US 2016/0154997 A1     Jun. 2, 2016

Related U.S. Application Data

(60) Provisional application No. 62/085,376, filed on Nov. 28, 2014.

(30) Foreign Application Priority Data

Feb. 27, 2015  (KR) .......................... 10-2015-0027961

(51) Int. Cl.
    *G06K 9/34*   (2006.01)
    *G06K 9/48*   (2006.01)
    *G06K 9/00*   (2006.01)
    *G06F 3/0488* (2013.01)

(52) U.S. Cl.
    CPC ..... *G06K 9/00416* (2013.01); *G06F 3/04883* (2013.01)

(58) Field of Classification Search
    CPC .. G06K 9/22; G06K 9/00416; G06F 3/04883; G06F 3/033; G06F 3/0416; G06F 3/03545; F02B 2075/025; G09B 5/065
    USPC ....... 382/187, 181, 189, 186, 199, 190, 195, 382/209, 188, 173, 177, 178, 179, 155, 382/161, 159, 290, 276, 286, 289, 293, 382/224, 228; 345/179, 173, 619; 715/256, 203, 864, 760, 261, 268, 863
    See application file for complete search history.

(56) References Cited

U.S. PATENT DOCUMENTS

| 5,475,767 | A   | 12/1995 | Du |
| 7,593,574 | B2  | 9/2009  | Simard et al. |
| 7,894,836 | B1  | 2/2011  | Fuoss et al. |
| 8,102,397 | B2* | 1/2012  | Perry .................... G06T 11/203 345/467 |

(Continued)

FOREIGN PATENT DOCUMENTS

| JP | 935001 A     | 2/1997 |
| JP | 2010205172 A | 9/2010 |

(Continued)

*Primary Examiner* — Sheela C Chawan
(74) *Attorney, Agent, or Firm* — Sughrue Mion, PLLC

(57) ABSTRACT

A handwriting input apparatus and method are provided. The handwriting input apparatus includes: a touch screen configured to display a handwriting corresponding to a touch input; and a processor configured to generate a skeleton for the handwriting by performing text recognition with respect to the handwriting, correct a style of the handwriting based on the generated skeleton, apply a beautification effect to the corrected style of the handwriting, and control the touch screen to display the beautified handwriting.

16 Claims, 17 Drawing Sheets

(56) References Cited

U.S. PATENT DOCUMENTS

| | | | |
|---|---|---|---|
| 8,503,788 B2 | 8/2013 | Woo et al. | |
| 8,786,607 B2 | 7/2014 | Cho et al. | |
| 8,842,127 B1* | 9/2014 | Burkey | G09G 5/24 |
| | | | 345/467 |
| 9,063,591 B2* | 6/2015 | Alameh | G06F 3/041 |
| 2007/0218430 A1 | 9/2007 | Chang et al. | |
| 2013/0147809 A1* | 6/2013 | Luo | G09G 5/28 |
| | | | 345/472.3 |

FOREIGN PATENT DOCUMENTS

| | | |
|---|---|---|
| KR | 1020090046142 A | 5/2009 |
| KR | 1020130066511 A | 6/2013 |

* cited by examiner

HANDWRITING INPUT — HANDWRITING STYLE CORRECTION — HANDWRITING STYLE BEAUTIFICATION

SUCCESSIVE
HANDWRITING INPUT

HANDWRITING WORD
CORRECTION

HANDWRITING STYLE
BEAUTIFICATION

FIG. 4B

EXAMPLE OF HANGEUL
HANDWRITING STYLE BEAUTIFICATION

| HANDWRITING FEATURE | RESULT OF FEATURE APPLICATION |
|---|---|
| PEN-TIP SHAPE | DRAIN-DROP |
| HANDWRITING DIRECTIVITY | NOT APPLIED |
| HANDWRITING SPEED | APPLIED |
| HANDWRITING PRESSURE | NOT APPLIED |

EXAMPLE OF ENGLISH (LATIN)
HANDWRITING STYLE BEAUTIFICATION

| HANDWRITING FEATURE | RESULT OF FEATURE APPLICATION |
|---|---|
| PEN-TIP SHAPE | DRAIN-DROP Drain-drop |
| HANDWRITING DIRECTIVITY | APPLIED |
| HANDWRITING SPEED | APPLIED |
| HANDWRITING PRESSURE | NOT APPLIED |

Second-order function, in which
second-order term coefficient is a,
first-order term coefficient is b,
and constant term is c,
is expressed as follows.

| HANDWRITING PARAGRAPH | TEXT |
|---|---|
| PEN-TIP SHAPE | CIRCLE |
| HANDWRITING DIRECTIVITY | NOT APPLIED |
| HANDWRITING SPEED | NOT APPLIED |
| HANDWRITING PRESSURE | NOT APPLIED |

620

$f(x) = ax^2 + bx + c$

| HANDWRITING PARAGRAPH | TEXT |
|---|---|
| PEN-TIP SHAPE | DRAIN-DROP |
| HANDWRITING DIRECTIVITY | APPLIED |
| HANDWRITING SPEED | APPLIED |
| HANDWRITING PRESSURE | NOT APPLIED |
| HANDWRITING COLOR | BLACK |
| BACKGROUND COLOR | Green |

HANDWRITING INPUT APPARATUS AND CONTROL METHOD THEREOF

CROSS-REFERENCE TO RELATED APPLICATION(S)

This application claims priority from Korean Patent Application No. 10-2015-0027961 filed on Feb. 27, 2015 in the Korean Intellectual Property Office, and benefit of U.S. Provisional Application No. 62/085,376 filed on Nov. 28, 2014 in the United States Patent and Trademark Office, the disclosures of which are incorporated herein by reference in their entirety.

BACKGROUND

1. Field

Apparatuses and methods consistent with exemplary embodiments relate to a handwriting input apparatus and a control method thereof, and more particularly, to a handwriting input apparatus and method that can beautify a handwriting input on a touch screen and provide the beautified handwriting on the touch screen.

2. Description of Related Art

As portable terminals, such as tablet personal computers (PCs) and smart phones have become widely spread, user demand for an intuitive input/output of information through handwriting input has increased. For example, in addition to user interfaces (UIs) that use a separate configuration, for example, a keyboard, a keypad, or a mouse, portable terminals include UIs that allow a user to input information using a finger or a touch pen.

For example, in a handwriting input device in the related art which recognizes a finger or a touch pen input, if a user directly writes on a touch pad, the input handwriting is recognized and displayed as it is. That is, the handwriting that is input by the user is directly displayed as it is without any conversion processing.

However, in the case where a user's hand is trembling when the user inputs the handwriting, the hand trembling is visible when the handwriting is displayed. Further, when a user does not have good handwriting, the displayed handwriting may be difficult to read and is not displayed beautifully. Therefore, a user's satisfaction in use may be lowered.

SUMMARY

Exemplary embodiments address at least the above disadvantages and other disadvantages not described above. Also, one or more of the exemplary embodiments are not required to overcome the disadvantages described above, and an exemplary embodiment may not overcome any of the problems described above.

One or more exemplary embodiments provide a handwriting input apparatus and a control method thereof, which can provide distinctive handwriting style beautification data that reflects an individual style of handwriting.

According to an aspect of an exemplary embodiment, there is provided a handwriting input apparatus including: a touch screen configured to display a handwriting corresponding to a touch input; and a processor configured to generate a skeleton for the handwriting by performing text recognition with respect to the handwriting, correct a style of the handwriting based on the generated skeleton, apply a beautification effect to the corrected style of the handwriting, and control the touch screen to display the beautified handwriting.

The processor may be further configured to apply the beautification effect to the corrected style of the handwriting based on at least one of a pen-tip, a handwriting direction, and a handwriting speed.

In response to the pen-tip to be applied to the handwriting is determined, the processor may be further configured to beautify the style of the handwriting by changing a thickness of strokes that constitute the handwriting based on the determined pen-tip and at least one of the handwriting direction and the handwriting speed.

The processor may be further configured to beautify the style of the handwriting by changing and applying the pen-tip based on at least one of the handwriting direction and the handwriting speed, and by changing a thickness of strokes that constitute the handwriting based on the changed pen-tip.

The processor may be further configured to determine a language that corresponds to the handwriting by performing text recognition with respect to the handwriting, and apply the beautification effect in accordance with the determined language based on at least one of the pen-tip, the handwriting direction, and the handwriting speed.

The processor may be further configured to analyze a connected handwriting structure with respect to the handwriting, determine the pen-tip to be applied to the handwriting based on the analyzed connected handwriting structure, and apply the beautification effect based on the determined pen-tip and at least one of the handwriting direction and the handwriting speed.

The processor may be further configured to beautify the style of the handwriting by determining whether the handwriting includes capital or lowercase letters, determining the pen-tip to be applied to the handwriting based on a result of the determination and an analyzed connected handwriting structure, and applying the beautification effect based on at least one of the handwriting direction and the handwriting speed.

The processor may be further configured to convert the handwriting into a text having a predetermined font by performing the text recognition with respect to the handwriting, generate the skeleton based on an outline of the predetermined font, and correct the style of the handwriting by correcting strokes of the handwriting based on strokes of the generated skeleton.

The handwriting input apparatus may further include a storage, wherein the processor may be further configured to store, in the storage, beautification information that includes at least one of sampling point information constituting strokes of the beautified handwriting, a layout of the beautified handwriting, color information of the beautified handwriting, coordinate information of the beautified handwriting, and beautification effect information of the handwriting.

According to an aspect of another exemplary embodiment, there is provided a method for controlling a handwriting input apparatus having a touch screen, including: receiving a handwriting corresponding to a touch input on the touch screen; generating a skeleton for the handwriting by performing text recognition with respect to the handwriting; correcting a style of the handwriting based on the generated skeleton; applying a beautification effect to the corrected style of the handwriting; and displaying, on the touch screen, the beautified handwriting.

The applying may apply the beautification effect to the corrected style of the handwriting based on at least one of a pen-tip, a handwriting direction, and a handwriting speed.

In response to the pen-tip to be applied to the handwriting being determined, the applying may beautify the style of the handwriting by changing a thickness of strokes that constitute the handwriting based on the determined pen-tip and at least one of the detected handwriting direction and the handwriting speed.

The applying may beautify the style of the handwriting by changing and applying the pen-tip based on at least one of the handwriting direction and the handwriting speed, and by changing a thickness of strokes that constitute the handwriting based on the changed pen-tip.

The applying may determine a language that corresponds to the handwriting by performing text recognition with respect to the handwriting, and apply the beautification effect in accordance with the determined language based on at least one of the pen-tip, the handwriting direction, and the handwriting speed.

The applying may analyze a connected handwriting structure with respect to the handwriting, determine the pen-tip to be applied to the handwriting based on the analyzed connected handwriting structure, and apply the beautification effect based on the determined pen-tip and at least one of the handwriting direction and the handwriting speed.

The applying may beautify the style of the handwriting by determining whether the handwriting includes capital or lowercase letters, determining the pen-tip to be applied to the handwriting based on a result of the determination and an analyzed connected handwriting structure, and applying the beautification effect based on at least one of the handwriting direction and the handwriting speed.

The correcting may convert the handwriting into a text having a predetermined font by performing the text recognition with respect to the handwriting, generate the skeleton based on an outline of the predetermined font, and correct the style of the handwriting by correcting strokes of the handwriting based on strokes of the generated skeleton.

The method for controlling the handwriting input apparatus may further include storing beautification information that includes at least one of sampling point information constituting strokes of the beautified handwriting, a layout of the beautified handwriting, color information of the beautified handwriting, coordinate information of the beautified handwriting, and beautification effect information of the handwriting.

According to an aspect of another exemplary embodiment, there is provided a device including: a touch screen configured to receive a handwriting from a user; and a processor configured to convert the handwriting into text having a predetermined font, generate a skeleton based on an outline of the text, correct a style of the handwriting based on a comparison between strokes of the handwriting and strokes of the generated skeleton, apply a beautification effect to the corrected style of the handwriting, and control the touch screen to display the beautified handwriting.

The processor may be further configured to apply the beautification effect by changing a thickness of strokes of the corrected style of the handwriting, based on at least one of a pen-tip, a speed of the handwriting, and a direction of the handwriting.

As described above, according to various exemplary embodiments, the distinctive handwriting beautification data that reflects the individual style of the handwriting can be provided. Further, the distinctive handwriting style beautification data that corresponds to a language and handwriting attributes, such as paragraph attributes, can be provided.

BRIEF DESCRIPTION OF THE DRAWINGS

The above and/or other aspects, features and advantages will be more apparent by describing certain exemplary embodiments with reference to the accompanying drawings, in which:

FIGS. 4A and 4B are diagrams illustrating examples of a beautification method in accordance with a language type according to an exemplary embodiment;

FIG. 6 is a diagram illustrating an example of a beautification method per paragraph according to an exemplary embodiment;

DETAILED DESCRIPTION

Figure 1A:
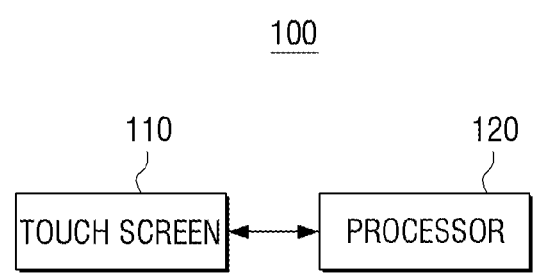
FIGS. 1A to 1C are diagrams illustrating the configuration of a handwriting input apparatus according to an exemplary embodiment.

Certain exemplary embodiments will now be described in greater detail with reference to the accompanying drawings. Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1B:
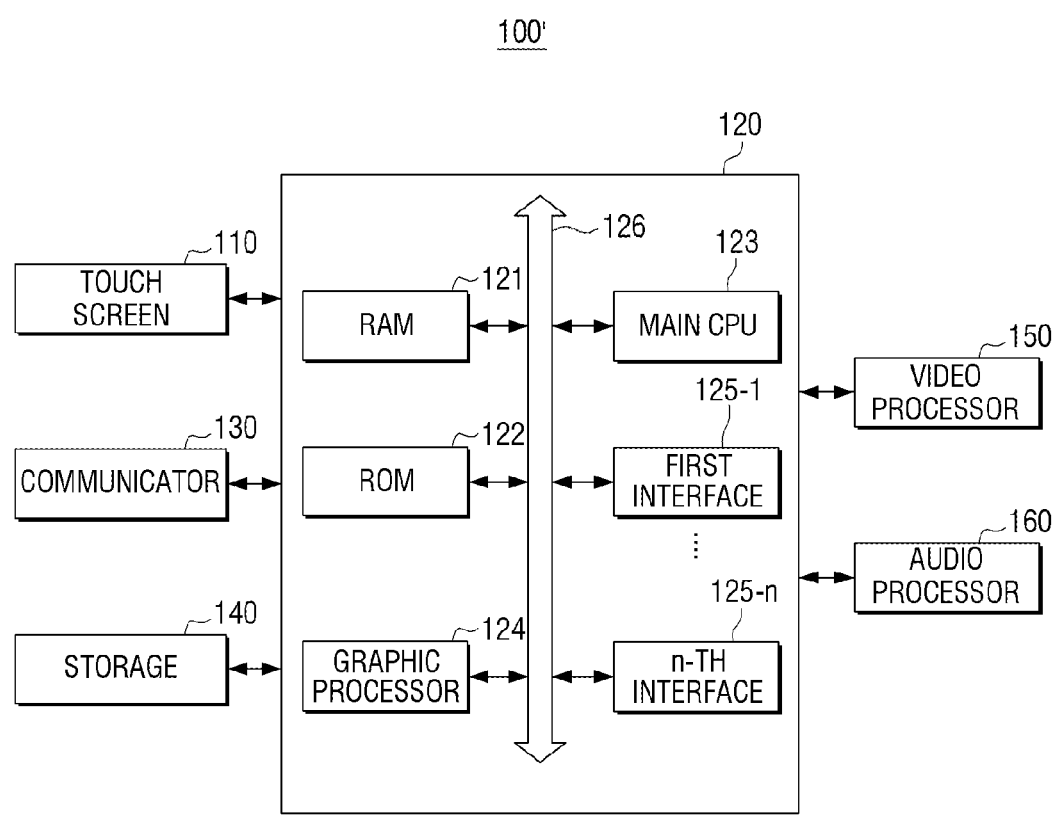
Figure 1C:
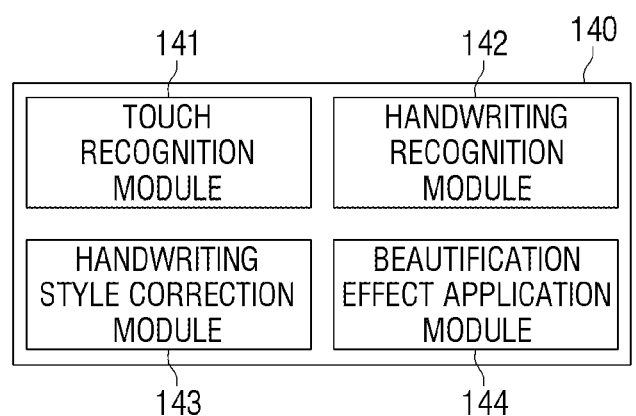

FIGS. 1A to 1C are diagrams illustrating the configuration of a handwriting input apparatus according to an exemplary embodiment.

FIG. 1A is a block diagram schematically illustrating the configuration of a handwriting input apparatus according to an exemplary embodiment.

Referring to FIG. 1A, a handwriting input apparatus 100 according to an exemplary embodiment includes a touch screen 110 and a processor 120.

The handwriting input apparatus 100 is applicable to various electronic devices that use touch sensors, such as a smart phone including a touch screen through which a user can input a handwriting by touch input, a cellular phone, a PMP (Portable Multimedia Player), an MP3 player, a tablet PC, a personal navigation device, and the like.

The touch screen 110 may be implemented to sense various types of touch operations. For example, the touch screen 110 may sense various types of touch operations, such as a touch operation by a user's hand, a touch operation by a specific pen, such as a stylus pen, a touch operation by a specific capacitive material, and the like.

As an example, the touch screen 110 may include a display panel (not illustrated) which displays output information that is output from the handwriting input apparatus, and an input sensing panel (not illustrated) through which a user can input various kinds of input functions.

For example, the display panel may be composed of an LCD (Liquid Crystal Display) or an OLED (Organic Light Emitting Diodes), and may be implemented to be integrated with the input sensing panel in structure. The display panel may include a handwriting screen of the handwriting input apparatus 100 to display various screens for displaying various kinds of operation states, menu states, application execution states, and services.

The input sensing panel may include a touch sensor. The touch sensor may be implemented as a capacitive type or a resistive type. The capacitive type touch sensor refers to a sensor which calculates touched coordinates by sensing micro-electricity, using a dielectric material that is coated on the surface of the display, that is induced in a user's body when a part of the user's body touches the surface of a display. The resistive type touch sensor refers to a touch sensor which includes two electrode plates built in the handwriting input apparatus 100 and calculates touch coordinates by sensing current flow that is caused by contact of the two plates at a touch point when a user touches the surface of the display. However, the touch sensor is not limited thereto. For example, an infrared sensor, an ultrasonic surface conductor, an integral strain gauge, or a piezoelectric effect mechanism may be used to sense a touch operation.

In addition, the handwriting input device 100 may determine whether a touch object, such as a finger or a stylus pen, comes in contact or approaches using a magnet and a magnetic field sensor, an optical sensor, or a proximity sensor instead of or in addition to the touch sensor.

According to one or more exemplary embodiments, the input sensing panel may be implemented by a panel that can sense both a finger input and a pen input, or may be implemented by two panels that include a touch panel that can sense the finger input and a pen recognition panel that can sense the pen input.

The processor 120 is configured to control the operation of the handwriting input apparatus 100. For example, the processor 120 can perform text recognition with respect to user's touch input. In this example, the processor 120 may extract feature information from a trace that is drawn by the handwriting in accordance with the touch input, and recognize characters having the same or similar feature information from the extracted feature information as characters that correspond to the handwriting. The feature information of the handwriting may include a length ratio, an angle, a direction, and relative position information, and may be pre-stored in a database (not illustrated). The characters may include various kinds of characters that are included in the current character concept or to be included in future, such as Hangeul consonants and vowels, English characters, Hiragana, Katakana, Chinese characters, Roman characters, Greek characters, Russian characters, special characters, symbol characters, graphics characters, and numerals.

For example, the processor 120 may generate a skeleton for the handwriting by performing the text recognition with respect to the handwriting, and correct the style of the handwriting on the basis of the generated skeleton. Thereafter, the processor 120 may apply a beautification effect to the corrected style of the handwriting, and control the touch screen 110 to display the beautified handwriting. Accordingly, the processor 120 may provide handwriting style beautification data in response to the user's handwriting input in real time.

As an example, the processor 120 may convert the handwriting into a text having a predetermined font by performing the text recognition with respect to the handwriting, and then generate the skeleton on the basis of an outline of the predetermined font. Thereafter, the processor 120 may correct the style of the handwriting by correcting strokes of the handwriting on the basis of strokes of the generated skeleton. The skeleton may refer to a frame, a gist, or a contour of the handwriting. For example, in the case where the text-recognized handwriting is converted into a "ground font," the skeleton that corresponds to an outline of the corresponding font can be generated.

Further, the processor may apply the beautification effect to the corrected style of the handwriting in accordance with at least one of a pen-tip, a handwriting directivity (i.e., a handwriting direction), a handwriting speed, and a handwriting pressure. The pen-tip may include various pen-tip types, such as a triangular type, a round type, a blade type, and a spoon-like type.

For example, the processor 120 may detect the speed of the strokes that constitute the handwriting on the basis of a distance between touch points that are successively input in accordance with the handwriting input and an input time difference, and detect the direction of the strokes that constitute the handwriting on the basis of the coordinates of the successively input touch points. Further, the processor 120 may detect the handwriting pressure on the basis of the touch pressure that is sensed by the touch sensor. However, this is merely exemplary, and the handwriting direction and the handwriting speed may be detected by various methods.

Further, in response to the pen-tip to be applied to the handwriting being determined, the processor 120 may beautify the style of the handwriting by changing the thickness of strokes that constitute the handwriting in accordance with the determined pen-tip on the basis of at least one of the detected handwriting direction and the handwriting speed. In this example, the pen-tip may be determined in accordance with user's selection, and according to circumstances, the processor 120 may automatically determine an arbitrary pen-tip. For example, in the case where the pen-tip is not selected by the user, the processor 120 may determine a user preference pen-tip on the basis of a handwriting input history, or determine a pen-tip that is set by default (e.g., a basic pen-tip).

Further, the processor 120 may beautify the style of the handwriting by changing and applying the pen-tip on the basis of at least one of the detected handwriting direction and the handwriting speed and changing the thickness of the strokes that constitute the handwriting in accordance with the changed pen-tip. For example, even in the case where the pen-tip is firstly determined, the processor 120 may change the pen-tip on the basis of at least one of the detected handwriting direction and the handwriting speed, and even in the case where the pen-tip is not firstly determined, the processor 120 may apply/change an appropriate pen-tip on the basis of at least one of the detected handwriting direction and the handwriting speed.

Further, the processor 120 may determine a language that corresponds to the handwriting by performing the text recognition with respect to the handwriting, and apply the beautification effect in accordance with the determined language on the basis of at least one of the pen-tip, the handwriting direction, and the handwriting speed. For example, if the handwriting language is English, the processor 120 may apply the beautification effect in accordance with the handwriting direction and the handwriting speed, while if the handwriting language is Hangeul, the processor 120 may beautify the style of the handwriting by applying the beautification effect in accordance with the handwriting speed. In this example, the processor 120 may apply the pen-tip that is selected by the user or may automatically determine and apply an appropriate pen-tip in accordance with the determined language.

Further, the processor 120 may analyze a connected handwriting structure with respect to the handwriting, determine the pen-tip to be applied to the handwriting on the basis of the analyzed connected handwriting structure, and apply the beautification effect in accordance with at least one of the handwriting direction and the handwriting speed. Here, the connected handwriting structure may indicate whether respective characters that constitute the handwriting are connected to one another.

Further, the processor 120 may determine whether the handwriting includes capital or lowercase letters, determine the pen-tip to be applied to the handwriting on the basis of the result of the determination and the analyzed connected handwriting structure, and apply the beautification effect in accordance with at least one of the handwriting direction and the handwriting speed.

Further, if the handwriting that includes a plurality of paragraphs is input, the processor 120 may apply different beautification effects to each of the paragraphs on the basis of respective paragraph attributes. For example, when a paragraph includes an equation, the processor 120 may additionally apply the beautification effect in accordance with at least one of a handwriting color and a background color.

Further, if the handwriting style beautification effect is applied, the processor 120 may store information that corresponds to the applied effect in a storage 140, which will be described below in greater detail. For example, the processor 120 may store beautification information that includes at least one of sampling point information constituting strokes of the handwriting, a layout of the handwriting, color information of the handwriting, coordinate information of the handwriting, and beautification effect information of the handwriting in the storage 140.

FIGS. 1B and 1C are diagrams illustrating the configuration of a handwriting input apparatus according to an exemplary embodiment.

Referring to FIG. 1B, a handwriting input apparatus 100' includes a touch screen 110, a processor 120, a communicator 130, a storage 140, an audio processor 150, and an audio processor 160. The detailed explanation of the configuration of FIG. 1B that is the same as the configuration illustrated in FIG. 1A will be omitted.

The communicator 130 (e.g., a transceiver) performs communication with an external device. The communicator 130 may perform communication with an external device using various communication methods, such as BT (BlueTooth), Wi-Fi (Wireless Fidelity), Zigbee, IR (Infrared), NFC (Near Field Communication), and the like.

The storage 140 stores various modules for driving the handwriting input apparatus 100'(e.g., when executed by the processor 120).

For example, the storage 140 may store therein a base module that processes signals transferred from hardware devices included in the handwriting input apparatus 100,' a storage module that manages a database (DB) or registry, a secure module, and a communication module. In this example, as illustrated in FIG. 1C, the storage 140 may include a touch recognition module 141 that recognizes a touch input, a handwriting recognition module 142 that can recognize the handwriting by extraction of feature points with respect to the input handwriting, a handwriting style correction module 143 that corrects the style of the recognized handwriting, and a beautification effect application module 144 that applies the beautification effect to the corrected handwriting.

Further, the processor 120 may control the operation of the handwriting input apparatus 100' by executing various kinds of modules stored in the storage 140.

As illustrated FIG. 1B, the processor 120 may include a RAM 121, a ROM 122, a main CPU 123, a graphic processor 124, first to n-th interfaces 125-1 to 125-*n*, and a bus 126. In this example, the RAM 121, the ROM 122, the main CPU 123, the graphic processor 124, and the first to n-th interfaces 125-1 to 125-*n* may be connected to one another through the bus 126.

The ROM 122 stores a command set for system booting. The main CPU 123 copies various kinds of application programs stored in the storage 140 into the RAM 121, and performs various kinds of operations by executing the application programs copied into the RAM 121.

The graphic processor 124 generates a screen that includes various objects, such as icons, images, and texts using an operator (not illustrated) and a renderer (not illustrated). The operator operates attribute values, such as coordinate values, shapes, sizes, and colors of the objects to be displayed according to the layout of the screen. The renderer generates various layout screens including the objects on the basis of the attribute values operated by the operator.

The main CPU 123 accesses the storage 140 and performs booting using the OS (operating system) stored in the storage 140. Further, the main CPU 123 performs various operations using various kinds of programs, content, and data stored in the storage 140. For example, the main CPU 123 may beautify the style of the handwriting that is recognized using the various modules in the storage 140 to provide the beautified handwriting.

The main CPU 123 may recognize the handwriting that is input through the touch screen 110 as a text using the handwriting recognition module and the character feature information stored in the storage 140. For example, the main CPU 123 may form a displacement signal that moves in a specific trace in accordance with the movement of a finger or an electronic pen as character data having a specific pattern, extract character feature information that coincides with the character data of the formed specific pattern from the storage 140, and recognize the character using a character conversion algorithm.

The first to n-th interfaces 125-1 to 125-*n* are connected to the various kinds of constituent elements as described above. One of the interfaces may become a network interface that is connected to an external device through a network.

In addition, the handwriting input apparatus 100' may further include the audio processor 160 for processing audio data, the video processor 150 for processing video data, a speaker (not illustrated) for outputting various kinds of audio data processed by the audio processor 160 as well as various kinds of notification sounds or voice messages, a camera (not illustrated) that captures a still image or a moving image in accordance with a user's control, and a microphone (not illustrated) for receiving an input of a user's voice or other sound and converting the received voice or sound into audio data.

Figure 2A:
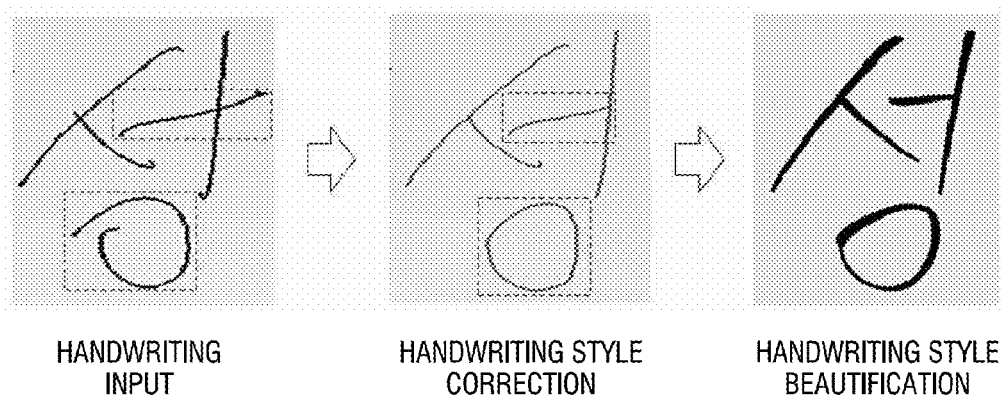
FIGS. 2A and 2B are diagrams illustrating examples of a process of correcting a style of handwriting and applying a handwriting style beautification effect according to an exemplary embodiment.
Figure 2B:
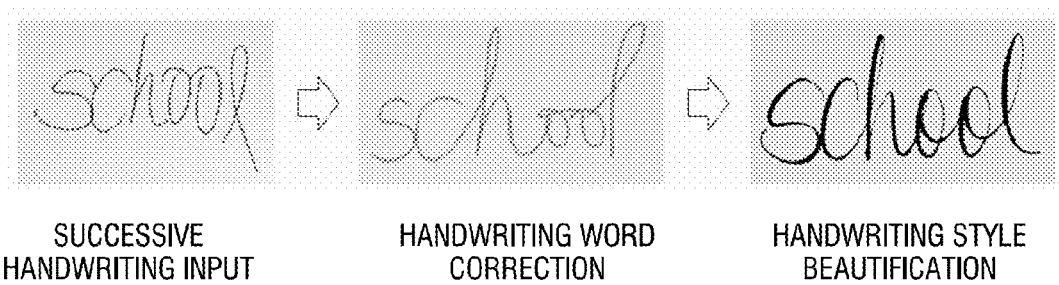

FIGS. 2A and 2B are diagrams illustrating examples of a process of correcting a style of handwriting and applying a handwriting style beautification effect according to an exemplary embodiment.

FIG. 2A illustrates an example of the result of applying the handwriting correction and the handwriting style beautification effect with respect to one character. In this example, as illustrated in FIG. 2A, if a handwriting character is input, the style of the handwriting may be corrected, and the handwriting style beautification effect may be applied to the corrected handwriting to display the beautified handwriting character.

FIG. 2B illustrates an example of the result of applying the handwriting correction and the handwriting style beautification effect with respect to successive handwriting inputs. In this example, as illustrated in FIG. 2B, the entire handwriting word in accordance with the successive handwriting inputs may be corrected, and the handwriting style beautification effect may be applied to the corrected handwriting word to display the beautified handwriting word.

A method for applying handwriting correction and handwriting style beautification effects according to an exemplary embodiment will now be described in greater detail below.

Figure 3A:
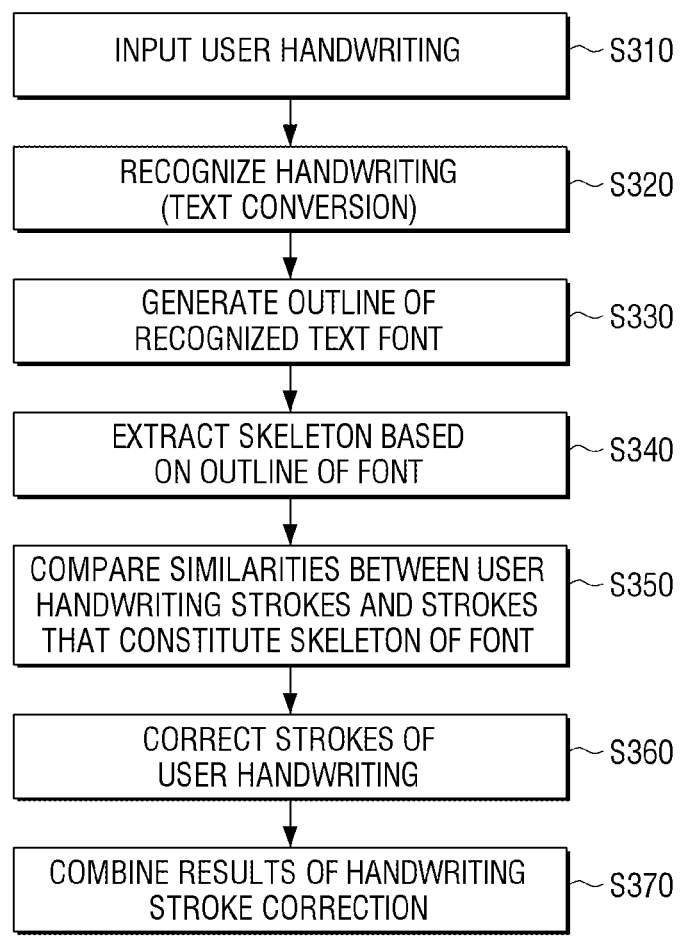
FIGS. 3A and 3B are diagrams illustrating examples of a method for correcting a style of handwriting according to an exemplary embodiment.
Figure 3B:
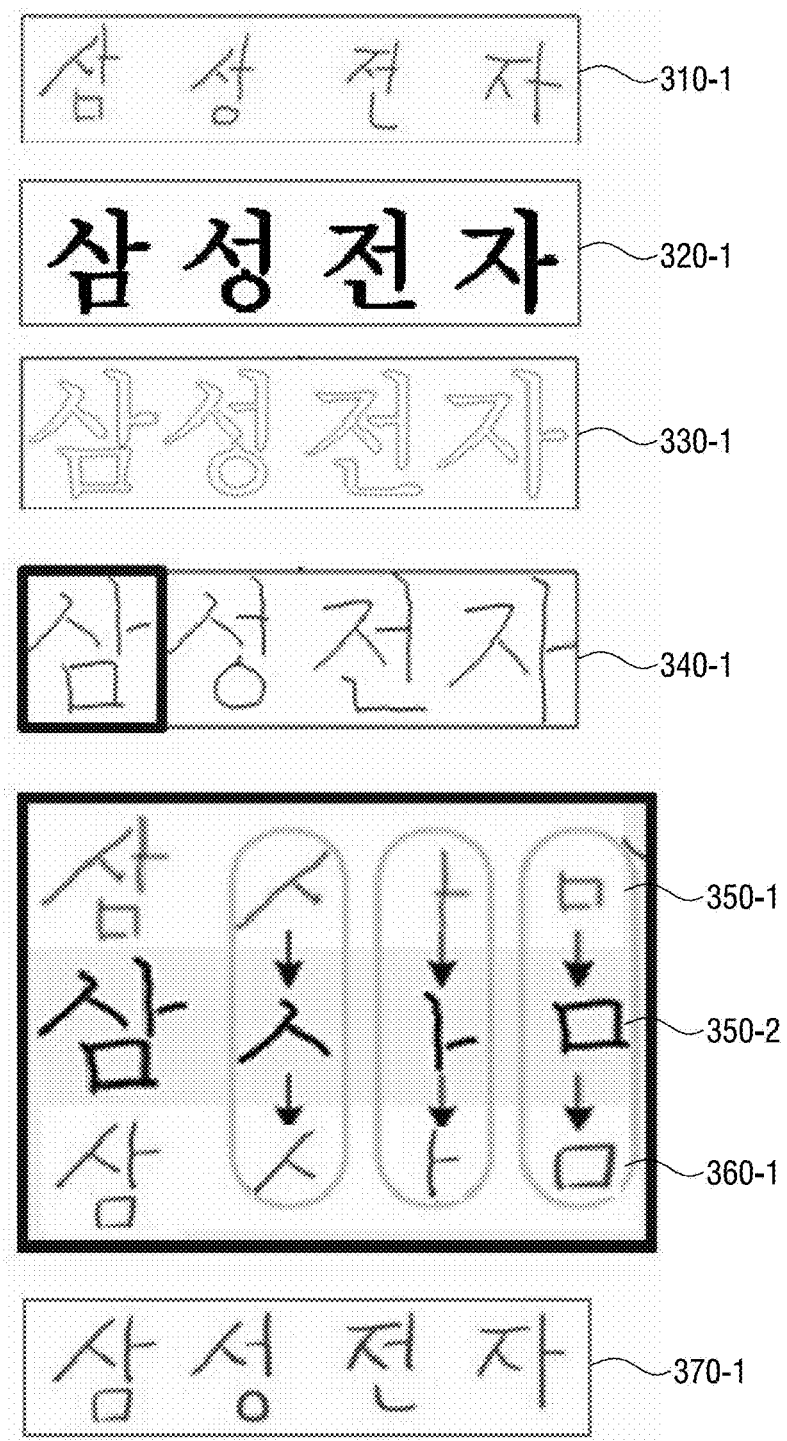

FIGS. 3A and 3B are diagrams illustrating examples of a method for correcting a style of handwriting according to an exemplary embodiment.

Referring to FIG. 3A, if a user's handwriting is input (S310), the handwriting is recognized and is converted into a text (S320). For example, as illustrated in FIG. 3B, the user's handwriting input 310-1 may be recognized and converted into a text 310-2 having a predetermined font.

Then, an outline of the recognized text font is generated (S330), and a skeleton that is based on the generated outline is extracted (S340). For example, as illustrated in FIG. 3B, the skeleton 340-1 may be generated on the basis of the outline 330-1 of the text font.

Then, by comparing similarities between strokes of the input user handwriting and strokes that constitute the generated font skeleton (S350), the strokes of the user handwriting may be corrected (S360). For example, as illustrated in FIG. 3B, by comparing the strokes 350-1 of the user handwriting input with the strokes 350-2 that constitute the font skeleton, corrected user handwriting strokes 360-1 may be generated.

Thereafter, by combining the results of the handwriting stroke correction, the corrected handwriting may be generated (S370). For example, as illustrated in FIG. 3B, the corrected strokes may be combined to generate the corrected handwriting 370-1.

Figure 4A:
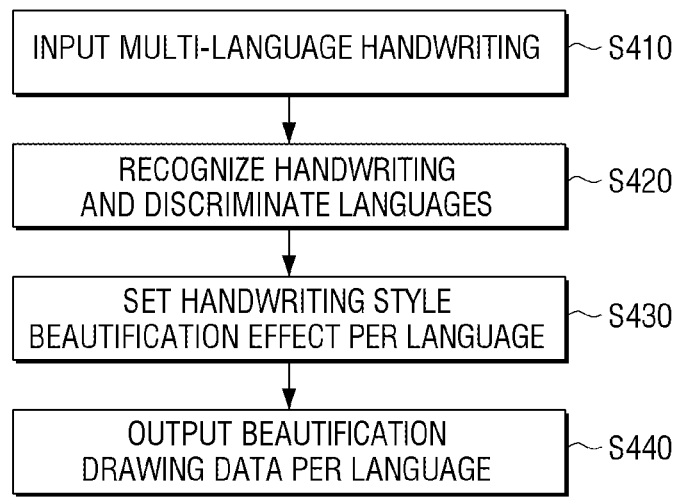

FIGS. 4A and 4B are diagrams illustrating examples of a beautification method in accordance with a language type according to an exemplary embodiment.

Referring to FIG. 4A, if a multi-language handwriting is input (S410), the handwriting is recognized and languages included in the handwriting are separated from each other (S420). For example, as illustrated in FIG. 4B, the handwriting including a Hangeul portion 451 and an English portion 452 is input, the handwriting is recognized, and the Hangeul portion and the English portion that are included in the handwriting are separated from each other.

Then, handwriting style beautification effects by languages are set on the basis of the predetermined information (S430). For example, as illustrated in FIG. 4B, in the case of the Hangeul handwriting, only the beautification effect in accordance with the pen-tip and the handwriting speed may be applied, while in the case of the English handwriting, the beautification effect in accordance with the pen-tip, the handwriting speed, and the handwriting direction may be applied.

Thereafter, handwriting style beautification drawing data is output (S440) for each of the languages. For example, as illustrated in FIG. 4B, the drawing data that includes the beautified Hangeul portion 461 and the beautified English portion 461 may be output.

Figure 5A:
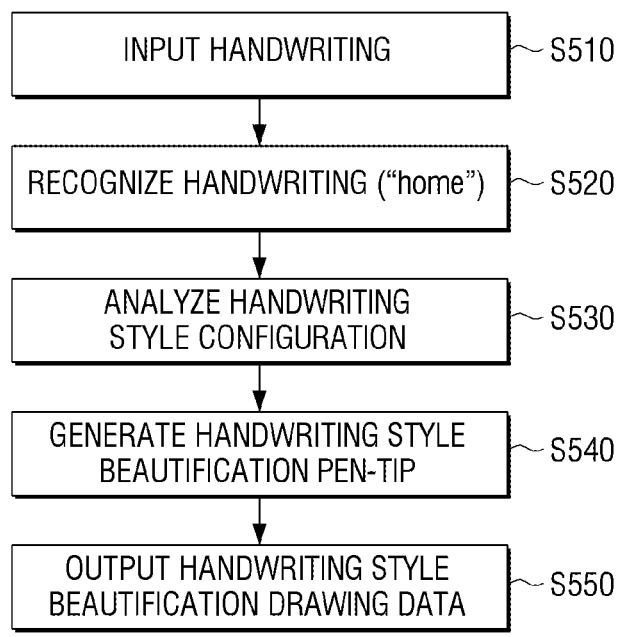
FIGS. 5A to 5C are diagrams illustrating examples of a beautification method in accordance with handwriting structures according to an exemplary embodiment.
Figure 5B:
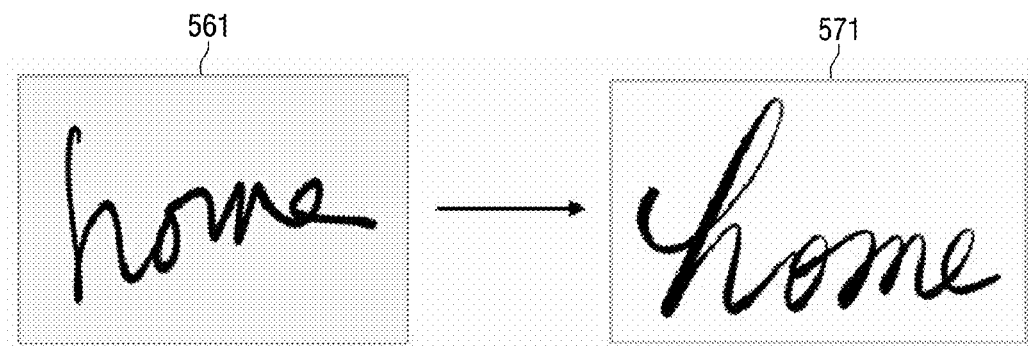
Figure 5C:
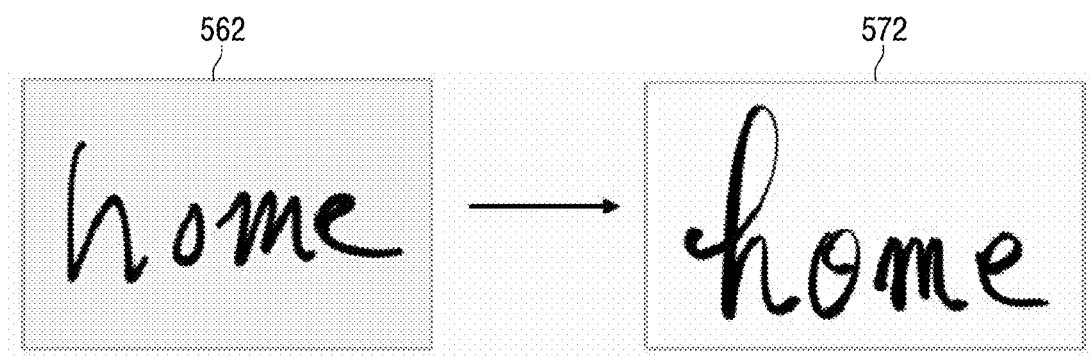

FIGS. 5A to 5C are diagrams illustrating examples of a beautification method in accordance with handwriting structures according to an exemplary embodiment.

Referring to FIG. 5A, if a user's handwriting is input (S510), the handwriting is recognized (S520). For example, as illustrated in FIG. 5B, the user's handwriting input 561 may be recognized.

Then, a handwriting structure is analyzed (S530), and a handwriting style beautification pen-tip that corresponds to the analyzed structure is generated (S540). For example, the connected handwriting structure may be analyzed, and in the case of a specific language, such as English, the analysis may be performed by discriminating between capital and lowercase letters. For example, a case 561 where the handwriting 561 includes connected lowercase letters (as illustrated in FIG. 5B) and a case 562 where the handwriting 562 includes lowercase letters that are not connected to one another (as illustrated in FIG. 5C) may be discriminated from each other, and handwriting that corresponds to each of the above-described cases may be generated.

Thereafter, the handwriting style beautification is performed in accordance with the generated pen-tip, and handwriting style beautification drawing data is output (S550). For example, beautification drawing data 571 that corresponds to the handwriting 561 that includes the connected lowercase letters (as illustrated in FIG. 5B) and beautification drawing data 572 that corresponds to the handwriting 562 that includes lowercase letters that are not connected to one another (as illustrated in FIG. 5C) may be output.

FIG. 6 is a diagram illustrating an example of a beautification method per paragraph according to an exemplary embodiment.

As illustrated in FIG. 6, different beautification effects may be applied and provided to paragraphs in accordance with paragraph structures. For example, as illustrated in FIG. 6, in the case of a paragraph 610 that includes general characters, a beautification effect in accordance with a circular pen-tip may be applied, and in the case of a paragraph 620 that includes an equation, a beautification effect in accordance with a drain-drop-shaped pen-tip, a handwriting direction, and a handwriting speed may be applied. Further, in the case of the paragraph 620 that includes the equation, it is also possible to additionally apply a beautification effect in accordance with the handwriting color and background color.

Figure 7:
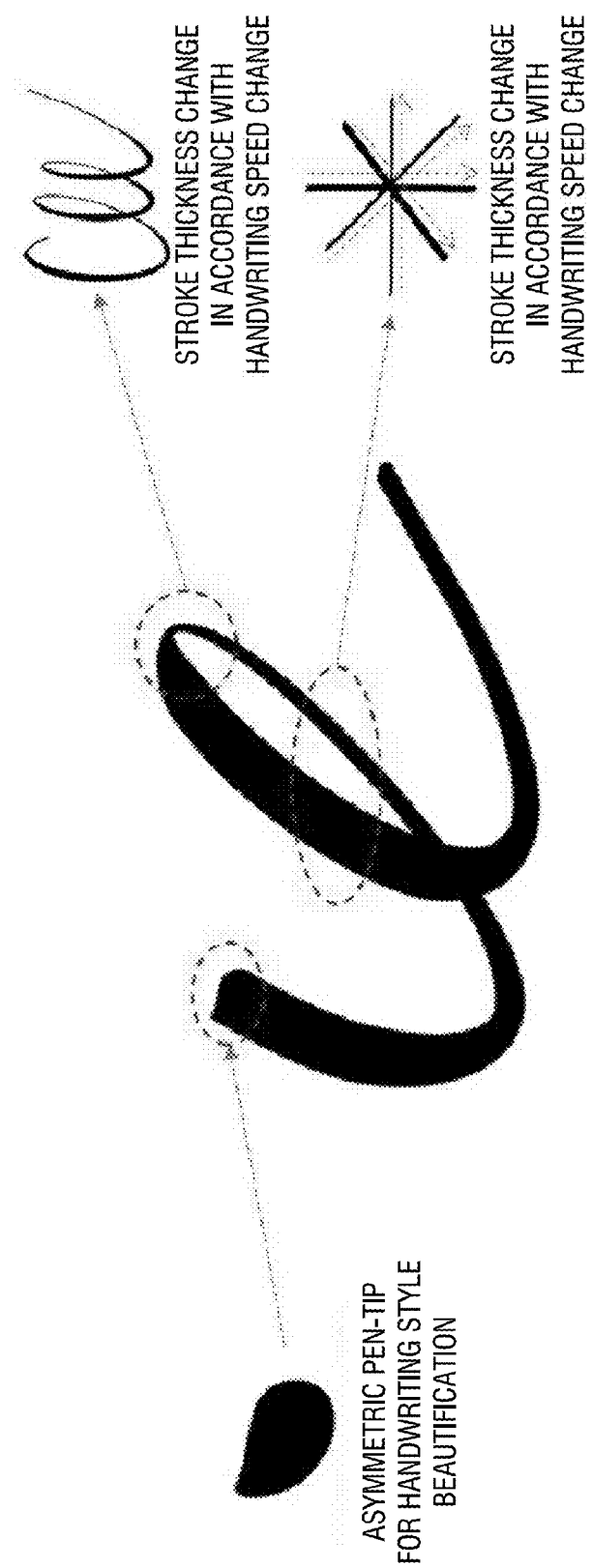
FIG. 7 is a diagram illustrating an example of the result of applying a handwriting style beautification effect according to an exemplary embodiment.

FIG. 7 is a diagram illustrating an example of the result of applying a handwriting style beautification effect according to an exemplary embodiment.

As illustrated in FIG. 7, a handwriting style beautification effect may be applied by changing the shape and thickness of strokes on the basis of the pen-tip, the handwriting direction, and the handwriting speed.

For example, as illustrated in FIG. 7, if the handwriting direction is in a direction from a lower side to an upper side, the thickness of the corresponding stroke may be applied as a first value, while if the handwriting direction is in a direction from the upper side to the lower side, the thickness of the corresponding stroke may be applied as a second value. Further, if the handwriting speed is equal to or higher than a predetermined threshold value, the thickness of the stroke may be applied as a third value, while if the handwriting speed is lower than the predetermined threshold value, the thickness of the stroke may be applied as a fourth value.

Further, it is also possible to change the type of the pen-tip on the basis of the handwriting direction and the handwriting speed. For example, if the handwriting speed is equal to or lower than a predetermined speed, a beautification effect in accordance with the first pen-tip may be applied, while if the handwriting speed exceeds the predetermined speed, a beautification effect in accordance with the first pen-tip may be applied.

Figure 8A:
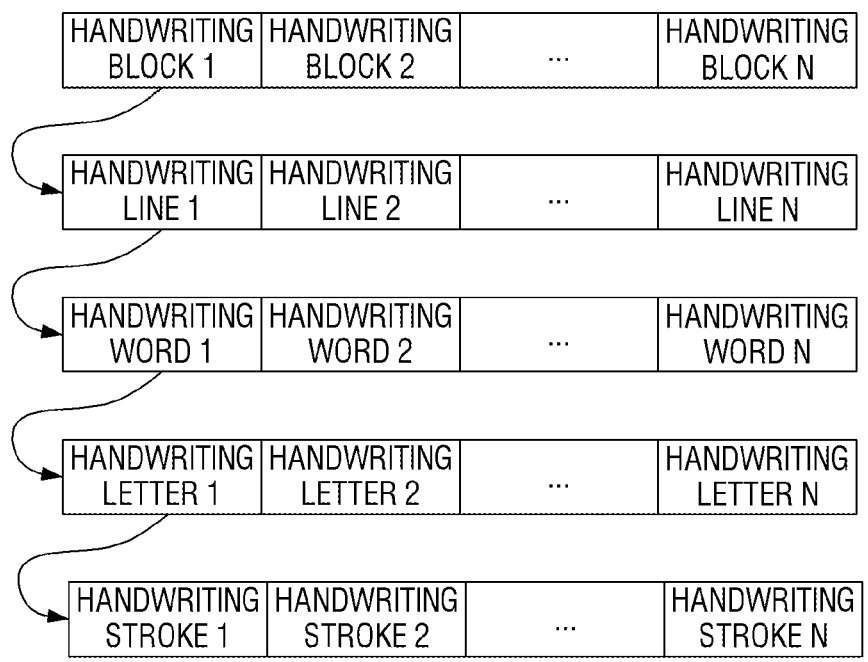
FIGS. 8A and 8B are diagrams illustrating examples of a method for storing handwriting style beautification data according to an exemplary embodiment.
Figure 8B:
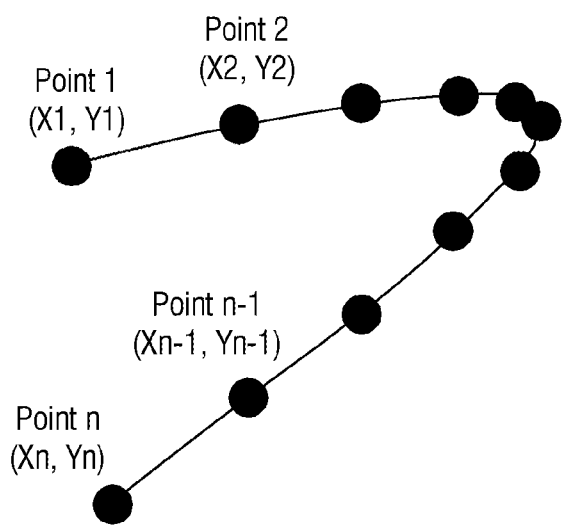

FIGS. 8A and 8B are diagrams illustrating examples of a method for storing handwriting style beautification data according to an exemplary embodiment.

FIG. 8A is a diagram illustrating an example of a handwriting layout analysis process. As illustrated in FIG. 8A, the input handwriting may be divided into handwriting blocks, and each of the divided handwriting blocks may be divided into handwriting lines. Further, each of the divided handwriting lines may be divided into handwriting words, and each of the divided handwriting words may be divided into handwriting characters. Further, each of the divided handwriting characters may be divided into handwriting strokes. Thereafter, beautification data as shown in Table 1 below may be generated and stored.

TABLE 1

| Strokes | Handwriting style beautification information | Detailed Contents |
|---|---|---|
| 1 | Handwriting style beautification strokes | The number of sampling points that constitute stroke |
| 2 | Handwriting structure analysis information | Discrimination of text, sketch, drawing, and equation |
| 3 | Handwriting and background color information | Discrimination of stroke and background colors |
| 4 | Handwriting style beautification information | Discrimination of pen-tip shape, handwriting direction/speed/pressure/feature reflection information |

TABLE 1-continued

| Strokes | Handwriting style beautification information | Detailed Contents |
|---|---|---|
| 5 | Handwriting coordinate information | Start point, middle coordinates, end point discrimination, the number of coordinates |

However, Table 1 is merely an example, and a part of information may be omitted or added in accordance with beautification effect application examples.

FIG. 8B is a diagram illustrating an example of a method for sampling a handwriting stroke to which the beautification effect is applied. As illustrated in FIG. 8B, sampling points (e.g., point 1, point 2, . . . point n–1, point n) are selected among points that constitute the handwriting stroke, and the ID, the number and coordinate information of the selected sampling points may be stored.

Figure 9:
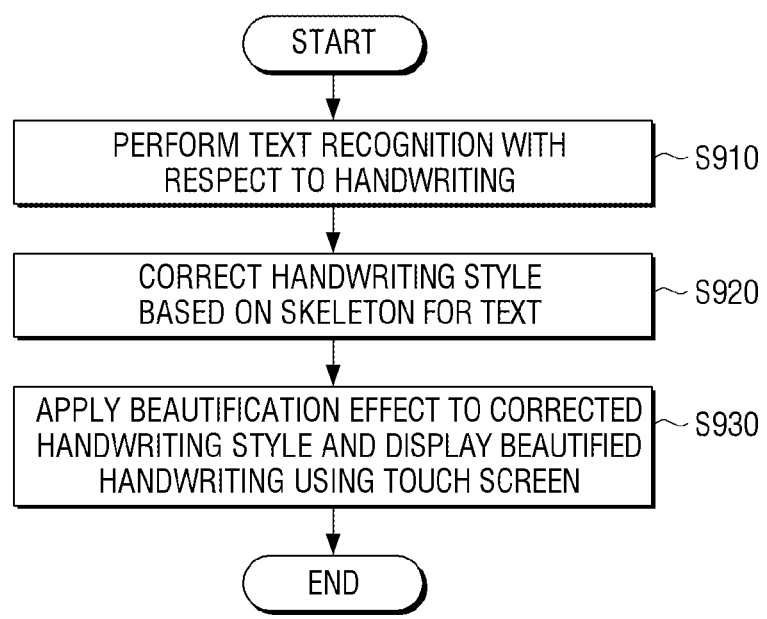
FIG. 9 is a flowchart illustrating an example of a method for controlling a handwriting input apparatus according to an exemplary embodiment.

FIG. 9 is a flowchart illustrating an example of a method for controlling a handwriting input apparatus according to an exemplary embodiment.

As illustrated in FIG. 9, according to a method for controlling a handwriting input apparatus having a touch screen according to an exemplary embodiment, if a handwriting in accordance with a touch input is input on the touch screen, a text recognition is performed with respect to the handwriting (S910).

Then, a skeleton for the recognized handwriting is generated and the style of the handwriting is corrected on the basis of the generated skeleton (S920).

Thereafter, a beautification effect is applied to the corrected style of the handwriting, and the beautified handwriting is displayed by the touch screen (S930).

During the displaying (S930), the beautification effect may be applied to the corrected style of the handwriting in accordance with at least one of a pen-tip, a handwriting direction, and a handwriting speed.

Further, during the displaying (S930), in response to the pen-tip to be applied to the handwriting being determined, the style of the handwriting may be beautified by changing the thickness of strokes that constitute the handwriting in accordance with the determined pen-tip on the basis of at least one of the detected handwriting direction and the handwriting speed, and the beautified handwriting may be displayed by the touch screen.

Further, during the displaying (S930), the style of the handwriting may be beautified by changing and applying the pen-tip on the basis of at least one of the detected handwriting direction and the handwriting speed and changing the thickness of the strokes that constitute the handwriting in accordance with the changed pen-tip, and the beautified handwriting may be displayed by the touch screen.

Further, during the displaying (S930), a language that corresponds to the handwriting may be determined by performing text recognition with respect to the handwriting, and the beautification effect may be applied in accordance with the determined language on the basis of at least one of the pen-tip, the handwriting direction, and the handwriting speed to display the beautified handwriting using the touch screen.

Further, during the displaying (S930), a connected handwriting structure with respect to the handwriting may be analyzed, and the pen-tip to be applied to the handwriting may be determined on the basis of the analyzed connected handwriting structure. Further, the beautification effect may be applied on the basis of the determined pen-tip in accordance with at least one of the handwriting direction and the handwriting speed, and the beautified handwriting may be displayed by the touch screen.

Further, during the displaying (S930), the style of the handwriting may be beautified by determining whether the handwriting includes capital or lowercase letters, determining the pen-tip to be applied to the handwriting on the basis of the result of the determination and an analyzed connected handwriting structure, and applying the beautification effect in accordance with at least one of the handwriting direction and the handwriting speed, and the beautified handwriting may be displayed by the touch screen.

Further, during the correcting the style of the handwriting (S920), the handwriting may be converted into a text having a predetermined font by performing the text recognition with respect to the handwriting, and the skeleton may be generated on the basis of an outline of the predetermined font. Further, the style of the handwriting may be corrected by correcting strokes of the handwriting on the basis of strokes of the generated skeleton.

The method for controlling the handwriting input apparatus may further include storing beautification information that includes at least one of sampling point information constituting strokes of the beautified handwriting, a layout of the beautified handwriting, color information of the beautified handwriting, coordinate information of the beautified handwriting, and beautification effect information of the handwriting.

The handwriting style beautification method according to exemplary an embodiment may be performed by a software application that a user directly uses on the OS. Further, the application may be provided in the form of an icon interface on the screen of the handwriting input apparatus 100, but is not limited thereto.

As described above, according to various exemplary embodiments, the distinctive handwriting style beautification data that reflects the individual style of the handwriting can be provided. Further, a handwriting style correction effect can be provided by analyzing the individual style of the handwriting. Further, the distinctive handwriting style beautification data that corresponds to a language and handwriting attributes, such as paragraph attributes, can be provided.

The handwriting style beautification method according to various exemplary embodiments may be performed by a software application that a user directly uses on the OS. Further, the application may be provided in the form of an icon interface on the screen of the handwriting input apparatus 100 that is implemented by a user terminal device, but is not limited thereto.

The method for controlling the handwriting input apparatus according to various exemplary embodiments as described above may be implemented by a program and may be stored in various recording media. That is, a computer program which can be processed by various kinds of processors to execute the various control methods as described above may be stored in the recording media to be used.

For example, a non-transitory computer readable medium may be provided, which stores a program that includes steps of generating a skeleton for a handwriting by performing text recognition with respect to the handwriting in accordance with a touch input, correcting a style of the handwriting on the basis of the generated skeleton, and applying a beautification effect to the corrected style of the handwriting.

The non-transitory computer readable medium may be any data storage device that is capable of storing the software or instructions and any associated data, data files, and data structures so that they can be read by a computer system or processing device. Examples of a non-transitory computer readable medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Further, the processor 120 may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions.

While the present disclosure has been shown and described with reference to certain exemplary embodiments thereof, it will be understood by those skilled in the art that various changes in form and detail may be made therein without departing from the spirit and scope of the inventive concept, as defined by the appended claims.

What is claimed is:

1. A handwriting input apparatus comprising:
a touch screen; and
a processor configured to:
control the touch screen to display a handwriting corresponding to a touch input, obtain a skeleton of the handwriting by character recognition, and modify strokes of the skeleton by comparing with strokes of a predetermined font skeleton,
wherein the processor changes a thickness of the modified strokes based on at least one of a direction of the strokes and a speed of the strokes.

2. The handwriting input apparatus as claimed in claim 1, wherein the processor is further configured to change the thickness of the modified strokes based on a pen-tip to be applied to the handwriting and at least one of the direction of the strokes and the speed of the strokes.

3. The handwriting input apparatus as claimed in claim 1, wherein the processor is further configured to identify a pen-tip based on at least one of the direction of the strokes and the speed of the strokes, and changes the thickness of the modified strokes based on the pen-tip.

4. The handwriting input apparatus as claimed in claim 1, wherein the processor is further configured to identify a language that corresponds to the handwriting, and changes the thickness of the modified strokes in accordance with the identified language.

5. The handwriting input apparatus as claimed in claim 1, wherein the processor is further configured to: analyze a connected handwriting structure with respect to the handwriting, determine a pen-tip to be applied to the handwriting based on the connected handwriting structure, and change the thickness of the modified strokes based on the determined pen-tip.

6. The handwriting input apparatus as claimed in claim 1, wherein the processor is further configured to: determine whether the handwriting includes capital or lowercase letters, determine a pen-tip to be applied to the handwriting based on a result of the determination of whether the handwriting includes capital or lowercase letters, and change the thickness of the modified strokes based on at least one of the direction of the strokes and the speed of the strokes.

7. The handwriting input apparatus as claimed in claim 1, wherein the strokes of the predetermined font skeleton are obtained based on an outline of a predetermined font.

8. The handwriting input apparatus as claimed in claim 1, further comprising a storage,
wherein the processor is further configured to generate a beautified handwriting by changing the thickness of the modified strokes, and
wherein the processor is further configured to control the storage to store, information that includes at least one of sampling point information constituting strokes of the beautified handwriting, a layout of the beautified handwriting, color information of the beautified handwriting, coordinate information of the beautified handwriting, and beautification effect information of the handwriting.

9. A method for controlling a handwriting input apparatus, comprising:
displaying a handwriting corresponding to a touch input on a touch screen;
obtaining a skeleton of the handwriting by character recognition;
modifying strokes of the skeleton by comparing with strokes of a predetermined font skeleton; and
changing a thickness of the modified strokes based on the least one of a direction of the strokes and a speed of the strokes.

10. The method as claimed in claim 9, wherein the changing changes the thickness of the modified strokes based on a pen-tip to be applied to the handwriting and at least one of the direction of the strokes and the speed of the strokes.

11. The method as claimed in claim 9, wherein the changing comprising identifying a pen-tip based on at least one of the direction of the strokes and the speed of the stroke, and changing the thickness of modified strokes based on the pen-tip.

12. The method as claimed in claim 9, wherein the changing comprising: identifying a language corresponding to the handwriting, and changing the thickness of the modified strokes in accordance with the identified language.

13. The method as claimed in claim 9, wherein the changing comprising: analyzing a connected handwriting structure with respect to the handwriting, determining a pen-tip to be applied to the handwriting based on the connected handwriting structure, and changing the thickness of the modified stroke based on the determined pen-tip.

14. The method as claimed in claim 9, wherein the changing comprising: determining whether the handwriting includes capital or lowercase letters, determining a pen-tip to be applied to the handwriting based on a result of the determination of whether the handwriting includes capital or lowercase letters, and changing the thickness of the modified strokes based on at least one of the direction of the strokes and the speed of the strokes.

15. The method as claimed in claim 9, wherein the strokes of the predetermined font skeleton are obtained based on an outline of a predetermined font.

16. The method as claimed in claim 9, further comprising
generating a beautified handwriting by changing the thickness of the modified strokes; and
storing beautification information that includes at least one of sampling point information constituting strokes of the beautified handwriting, a layout of the beautified handwriting, color information of the beautified handwriting, coordinate information of the beautified handwriting, and beautification effect information of the handwriting.

* * * * *